(12) United States Patent  
Miller et al.

(10) Patent No.: US 10,068,193 B2  
(45) Date of Patent: *Sep. 4, 2018

(54) SYSTEM AND METHOD FOR RISK DETECTION REPORTING AND INFRASTRUCTURE

(71) Applicant: A-T Solutions, Inc., Vienna, VA (US)

(72) Inventors: Charles J. Miller, El Cerrito, CA (US); Yair Frankel, Westfield, NJ (US); Noah J. Rosenkrantz, Oakland, MA (US)

(73) Assignee: A-T Solutions, Inc., Vienna, VA (US)

(*) Notice: Subject to any disclaimer, the term of this patent is extended or adjusted under 35 U.S.C. 154(b) by 330 days.

This patent is subject to a terminal disclaimer.

(21) Appl. No.: 14/930,397

(22) Filed: Nov. 2, 2015

(65) Prior Publication Data

US 2016/0055435 A1    Feb. 25, 2016

Related U.S. Application Data

(63) Continuation of application No. 14/463,594, filed on Aug. 19, 2014, now Pat. No. 9,177,279, which is a (Continued)

(51) Int. Cl.
*G06Q 10/00* (2012.01)
*G06Q 10/06* (2012.01)
(Continued)

(52) U.S. Cl.
CPC ......... *G06Q 10/0635* (2013.01); *G06Q 10/08* (2013.01); *G06Q 40/08* (2013.01); *H04L 63/1433* (2013.01)

(58) Field of Classification Search
CPC .................................................. G06Q 10/0635
See application file for complete search history.

(56) References Cited

U.S. PATENT DOCUMENTS

| 4,775,853 A | 10/1988 | Perez Borruat |
| 5,021,766 A | 6/1991 | Genahr et al. |

(Continued)

FOREIGN PATENT DOCUMENTS

| EP | 1180741 | 2/2002 |
| JP | 2000-148842 | 5/2000 |

(Continued)

OTHER PUBLICATIONS

Allen et al., State of the practice of intrusion detection technologies, Carnegie Mellon Software Engineering Institute, Jan. 2000, 239 pages.

(Continued)

*Primary Examiner* — Jonathan G Sterrett
(74) *Attorney, Agent, or Firm* — Dentons US LLP

(57) ABSTRACT

A method, a system, and a device for monitoring risks associated with at least one business process, including: evaluating at least one of a plurality of document instances, wherein each of the document instances includes, in association therewith, a plurality of document values, against a plurality of risk categories; implementing the plurality of risk categories pursuant to at least one acceptable risk policy approved for the at least one business process; and qualifying at least one of the at least one of the plurality of documents pursuant to an approval rating of the at least one document in at least one risk category. The system, method, and device efficiently monitor risk, and allow for flexibility in modifying or updating risk policy.

24 Claims, 10 Drawing Sheets

Related U.S. Application Data continuation of application No. 13/936,958, filed on Jul. 8, 2013, now Pat. No. 8,812,343, which is a continuation of application No. 10/863,582, filed on Jun. 8, 2004, now Pat. No. 8,484,066.

(60) Provisional application No. 60/476,628, filed on Jun. 9, 2003.

(51) Int. Cl.
  *G06Q 40/08* (2012.01)
  *G06Q 10/08* (2012.01)
  *H04L 29/06* (2006.01)

(56) References Cited

U.S. PATENT DOCUMENTS

| | | | |
|---|---|---|---|
| 5,239,459 | A | 8/1993 | Hunt et al. |
| 5,268,672 | A | 12/1993 | Kerr |
| 5,852,402 | A | 12/1998 | Perry |
| 6,324,647 | B1 | 11/2001 | Bowman-Amuah |
| 6,408,297 | B1 | 6/2002 | Ohashi |
| 6,484,203 | B1 | 11/2002 | Porras et al. |
| 6,519,703 | B1 | 2/2003 | Joyce |
| 6,944,673 | B2 | 9/2005 | Malan et al. |
| 6,996,843 | B1 | 2/2006 | Moran |
| 7,002,472 | B2 | 2/2006 | Stratmoen et al. |
| 7,006,992 | B1 | 2/2006 | Packwood |
| 7,274,387 | B2 | 9/2007 | Gupta et al. |
| 2002/0099598 | A1 | 7/2002 | Eicher et al. |
| 2002/0107953 | A1 | 8/2002 | Ontiveros et al. |
| 2002/0112185 | A1 | 8/2002 | Hodges |
| 2002/0138371 | A1 | 9/2002 | Lawrence et al. |
| 2003/0046128 | A1 | 3/2003 | Heinrich |
| 2003/0065613 | A1 | 4/2003 | Smith |
| 2003/0105859 | A1 | 6/2003 | Garnett et al. |
| 2003/0188290 | A1 | 10/2003 | Corral |
| 2004/0010571 | A1 | 1/2004 | Hutchinson et al. |
| 2004/0015376 | A1 | 1/2004 | Zhu et al. |
| 2004/0044615 | A1 | 3/2004 | Xue et al. |
| 2004/0257223 | A1 | 12/2004 | Webb |
| 2005/0013417 | A1 | 1/2005 | Zimmers et al. |
| 2005/0018618 | A1 | 1/2005 | Mualem et al. |
| 2006/0059557 | A1 | 3/2006 | Markham et al. |

FOREIGN PATENT DOCUMENTS

| | | |
|---|---|---|
| JP | 2000-222429 | 8/2000 |
| JP | 2002-149959 | 5/2002 |
| JP | 2002-542982 | 12/2002 |
| JP | 2003-006399 | 1/2003 |
| JP | 2004-185219 | 7/2004 |
| JP | 2004-537798 | 12/2004 |
| JP | 2005-538000 | 12/2005 |
| WO | WO2002-041120 | 5/2002 |
| WO | WO2003-012589 | 2/2003 |
| WO | WO2004-022434 | 3/2004 |

OTHER PUBLICATIONS

Bace et al., Intrusion Detection Systems, NIST Special Publication on Intrusion Detection System, 2001, 51 pages.

Berdica, An introduction to road vulnerability: what has been done, is done and should be done, Transport Policy, 2002, pp. 117-127.

Brender, The use of internal models for determining liabilities and capital requirements, Apr. 2002, North American Actuarial Journal, vol. 6, No. 2, pp. 1-10.

Erera et al., Cost of Security for Sea Cargo Transport, The Logistics Institute, Asia Pacific White Paper, May 2003, 10 pages.

Fong, Mining suspicious patterns in physical environment, IEEE, 2007, pp. 419-422.

Gay, Audit risk reduction, Mar. 2002, Australian CPA, vol. 72 No. 2, pp. 68-70.

Harrington, Can we secure international trade?, Nov. 2002, Transportation and Distribution, vol. 43, No. 11, pp. 48-56.

Huang et al., A large scale distributed intrusion detection framework based on attack strategy analysis, Comput. Networks, 1999, 12 pages.

Ilgun et al., State transition analysis: A rule-based intrusion detection approach, IEEE transactions on software engineering, vol. 21, No. 3, Mar. 1995, pp. 181-199.

Karger et al., Security and privacy threats to ITS, Steps Forward Proceedings of the Second World Congress on Intelligent Transport Systems, 1995, vol. 5, pp. 2452-2458.

King IV, Achieving nuclear, biological, and chemical defense synergy through integrated land-, air-, and space-based sensors and analysis, Thesis, 1999, 82 pages.

Koc, Cryptographic Hardware and Embedded Systems, CHES 2000, Second International Workshop, Worcester, MA, Aug. 17-18, 2000, 365 pages.

Noferi, Security in the corporate homeland, Sep. 2002, BioPharm, vol. 15, No. 9, p. 74.

Ramakrishnan et al., Model-based vulnerability analysis of computer systems, Proceedings of the 2nd international Workshop, 1998, 8 pages.

Trunk, Software teams up for assault on 9-11, Jan. 2002, Material Handling Management vol. 57, No. 1, pp. 39-44.

Trunk, Software teams up for assault on 9-11, Material Handling Management, vol. 57, No. 1, 2002, pp. 39-44.

Violino, Building B2B trust: users are turning to new services to make sure they're dealing with trustworthy businesses for online transactions, Jun. 17, 2002, Computerworld, 36, 25, 32(2), 4 pages.

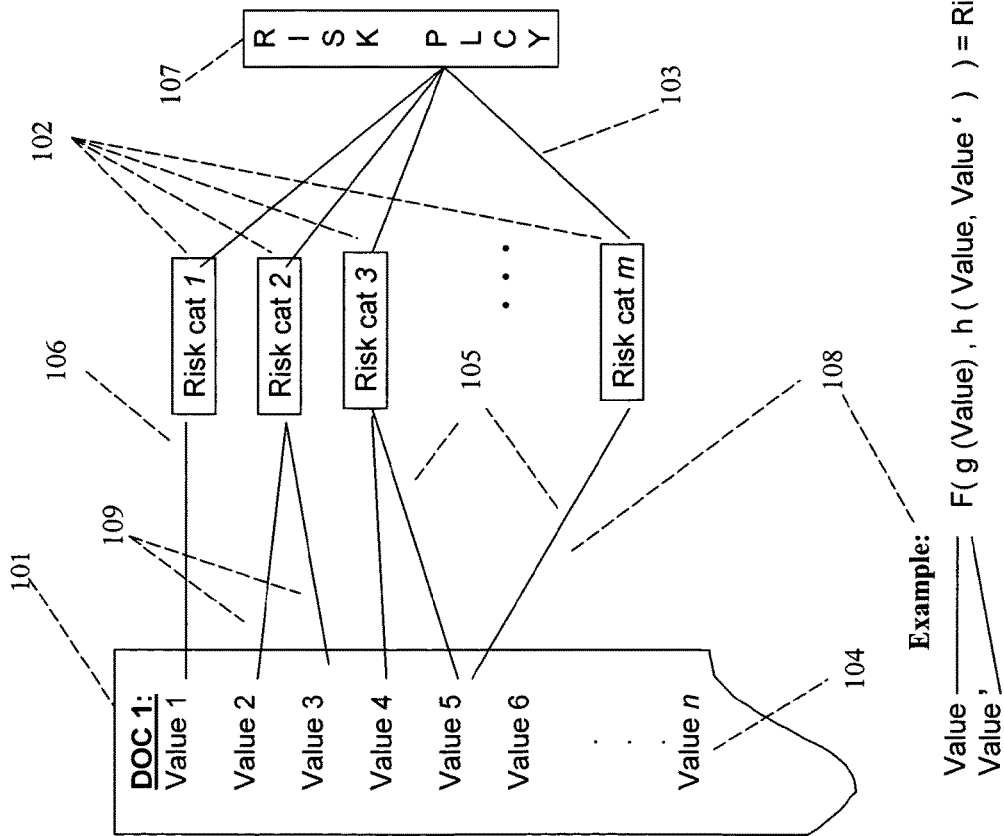
Figure 1: mapping document, risk categories and Policy

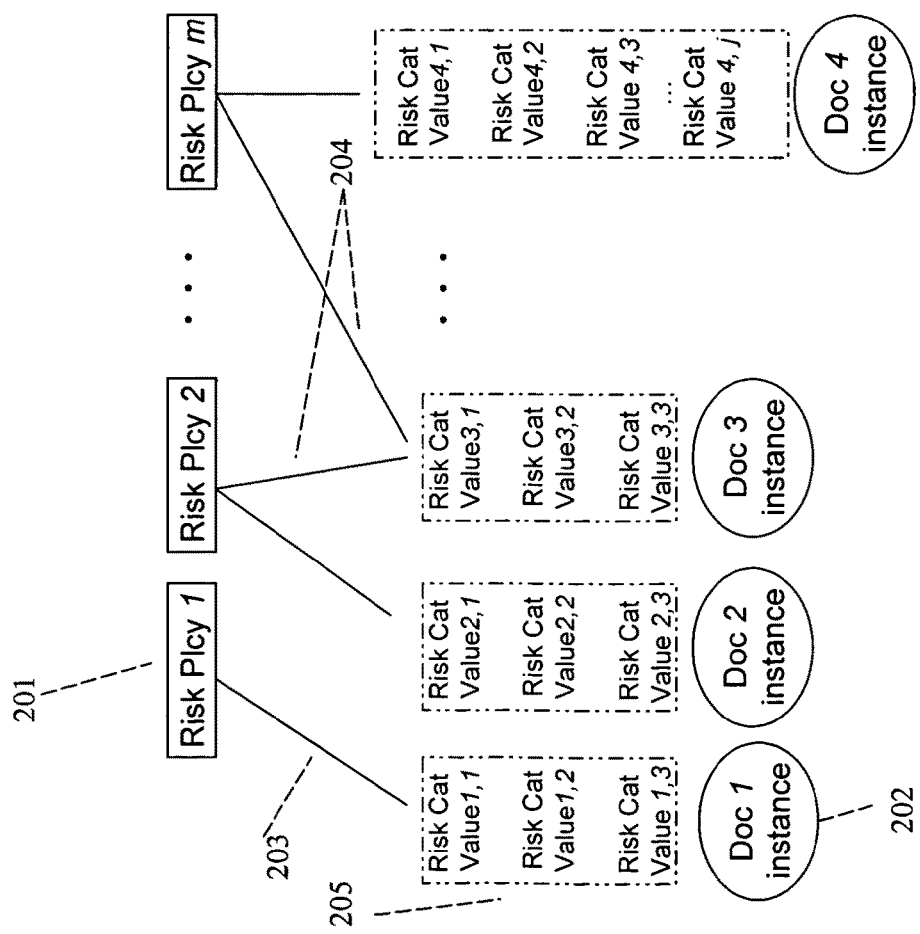
Figure 2: Multiple risk policies

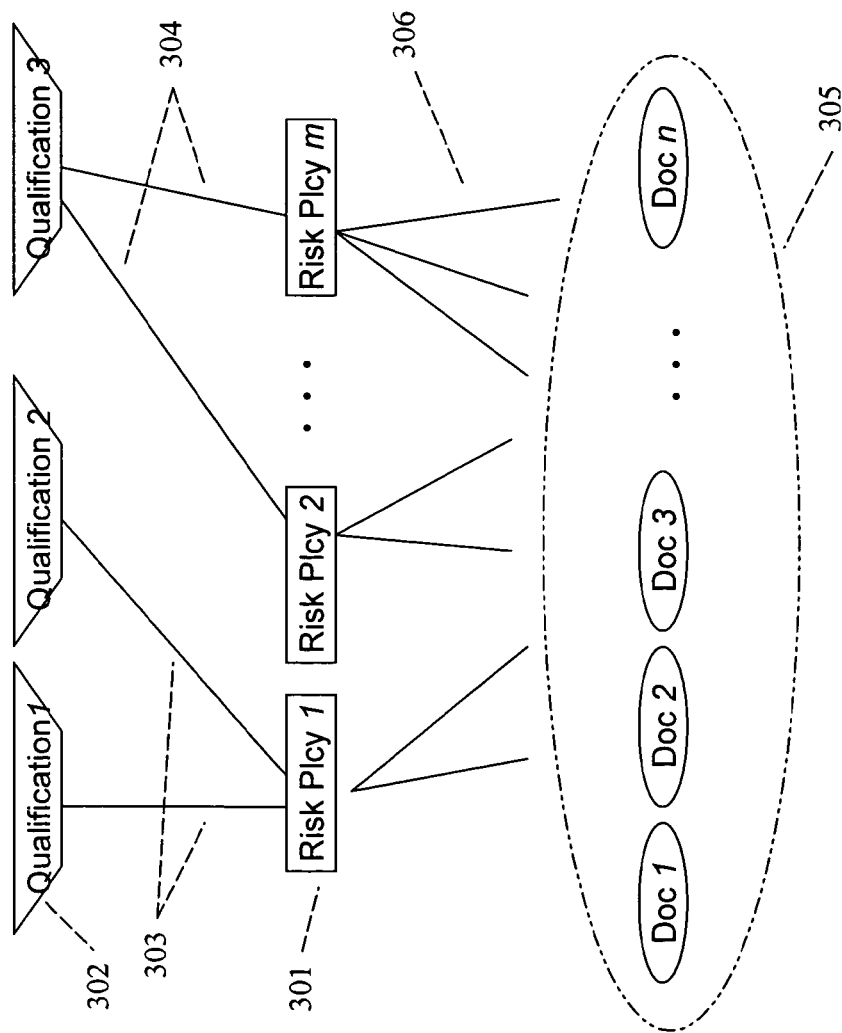
Figure 3: Relationships between documents, policies and qualifications

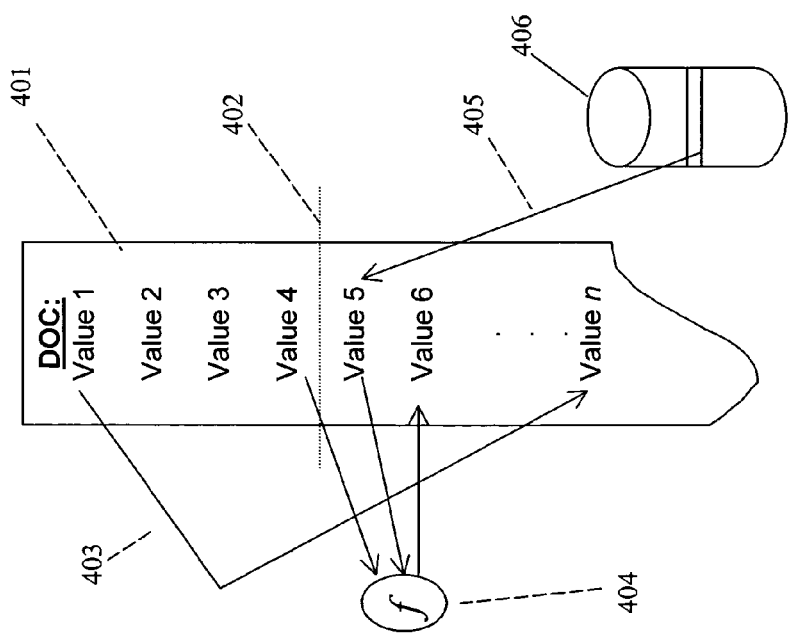
Figure 4: Obtaining values from a database

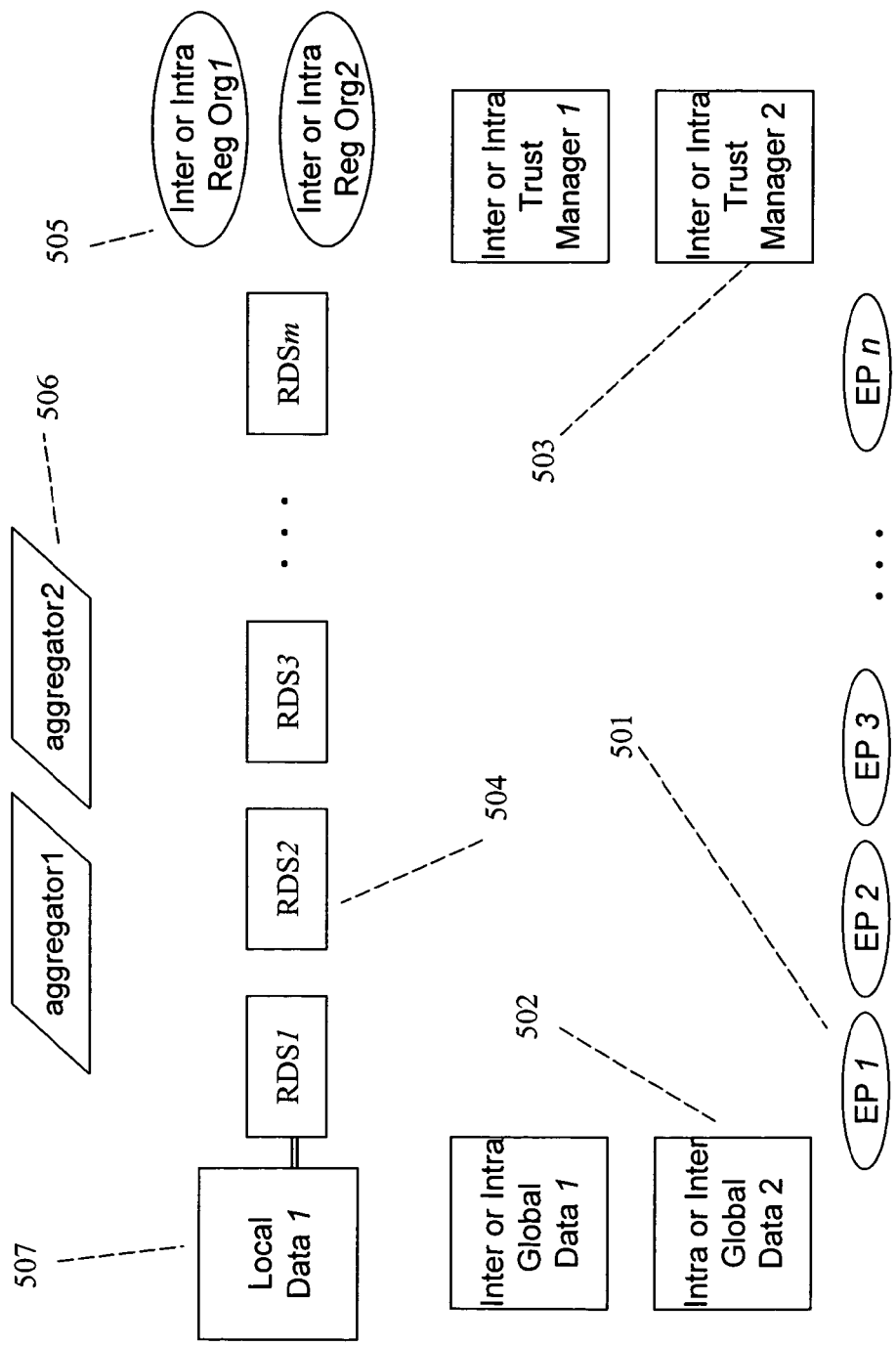
Figure 5: Some Components in an RDS infrastructure

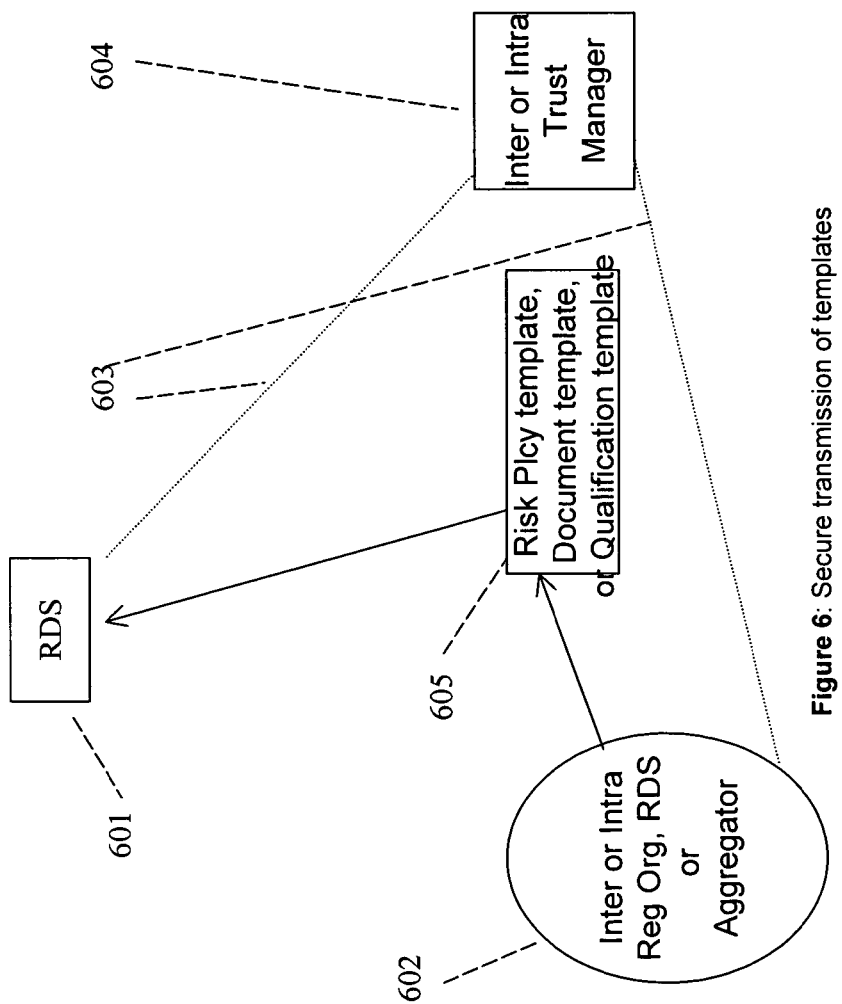
Figure 6: Secure transmission of templates

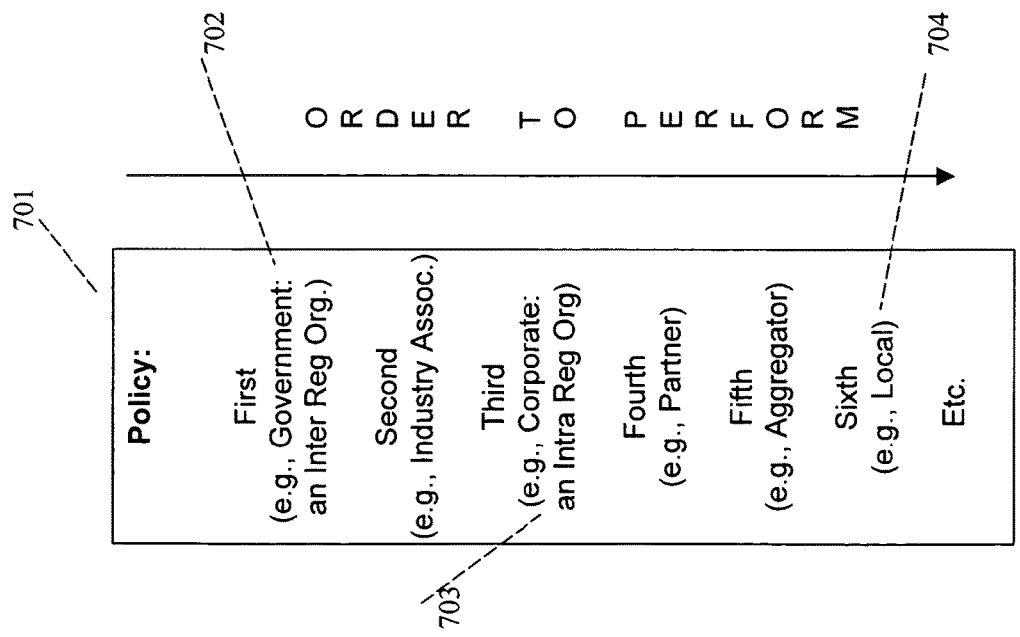
Figure 7: Order which policies of different organizations may be performed.

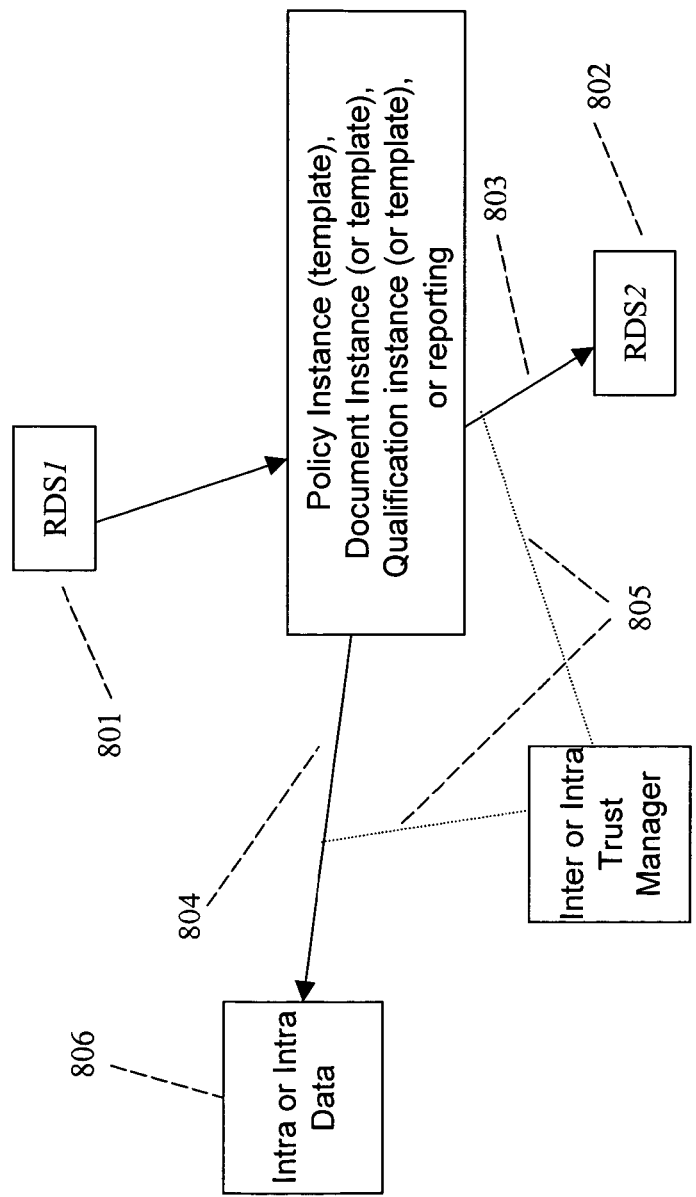
Figure 8: Secure transmission of the secure transmission of instances or templates.

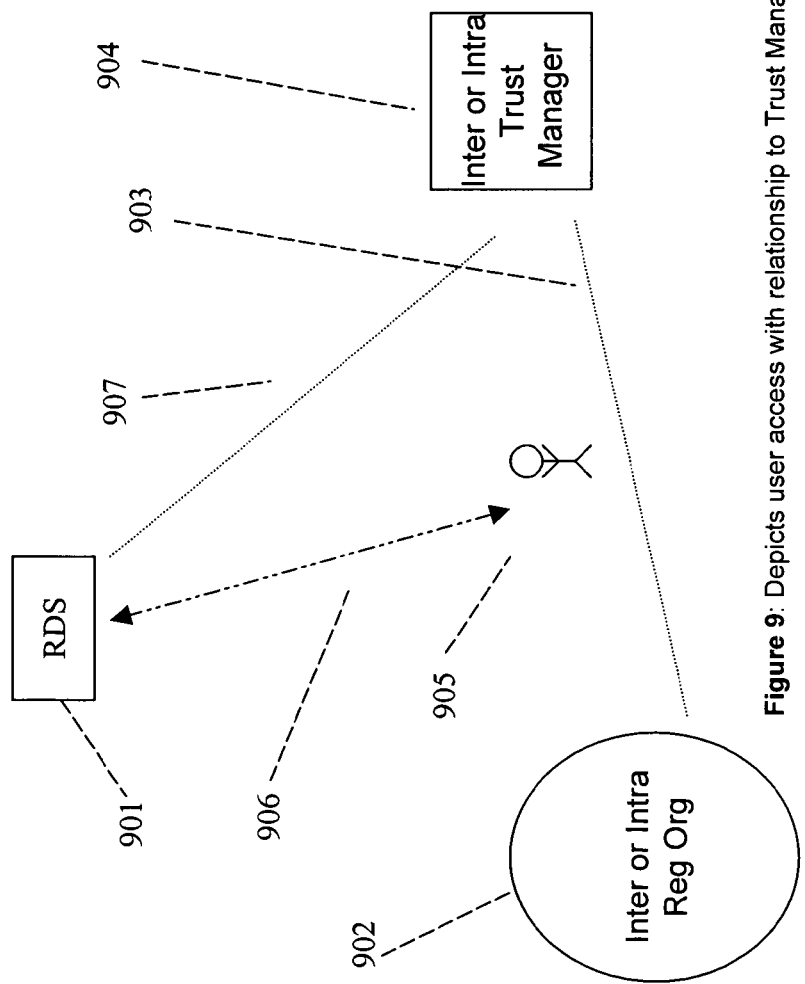
Figure 9: Depicts user access with relationship to Trust Manager

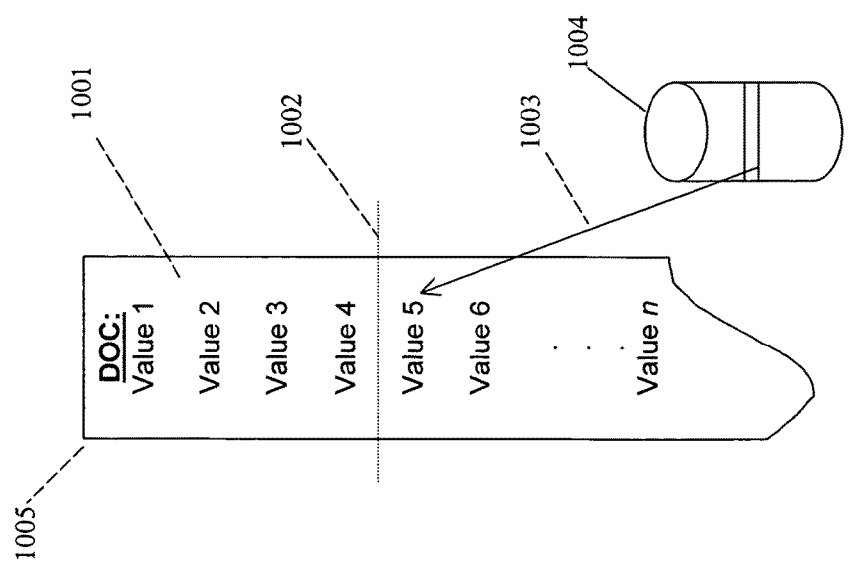
Figure 10: Combining documents

SYSTEM AND METHOD FOR RISK DETECTION REPORTING AND INFRASTRUCTURE

CROSS-REFERENCE TO RELATED APPLICATION

The present application is a continuation of U.S. Nonprovisional application Ser. No. 14/463,594 filed 19 Aug. 2014; which is a continuation of U.S. Nonprovisional application Ser. No. 13/936,958 filed 8 Jul. 2013, now U.S. Pat. No. 8,812,343 issued on Aug. 19, 2014; which is a continuation of U.S. Nonprovisional application Ser. No. 10/863,582 filed 8 Jun. 2004, now U.S. Pat. No. 8,484,066 issued 9 Jul. 2013, which claims priority to U.S. Provisional Application Ser. No. 60/476,628 filed 9 Jun. 2003; each of which is incorporated herein by reference in its entirety.

BACKGROUND OF THE INVENTION

The present invention is related to the field of risk management, and, more specifically, to risk analysis of systems and subcomponents, including the review, messaging, infrastructure and associated processes of documents and messages related to a risk state.

Assessing risks and making decisions based on risks is common. For example, banking and investment institutions assess risks, and make risk determinations on investments, loans, and other transactions based on those assessed risks. Financial institutions, for example, may look at risks that include foreign exchange (FX) risk, reputation risk, credit risk, and operational risk in making determinations about, among other things, types, costs and approaches to entering into counterparty transactions. Insurance companies may make similar determinations to evaluate risk versus reward, and issue an insurance policy based on probability of claims and likely claim magnitude. In such instances, available and appropriate historical data may be used to support decision making for current and future actions.

Technologies have been developed to assess risks and support determinations for actions based on the assessed risks. However, processes and architecture for risk management in business processes have historically been difficult to deploy across one or a multitude of local (intra-) and external (inter-) business and technological domains. Further, in existing systems, once risk based decisions are made, various actions may be difficult to perform, including the denial of a transaction to be performed, or initiation of new transactions or transitions (e.g., to make and/or sell automatically to rebalance accounts, qualify for or obtain insurance), and/or notification warnings to appropriate personnel.

Data security controls use risk assessment with regard to data systems (e.g., networks and computers). Based on a specified policy that sets forth what is acceptable and unacceptable, and which may include attention to "Signatures", patterns of appropriate or inappropriate actions (actions on the host/network system) may be allowed or denied. Historical information may be kept to determine, in part, what may be acceptable based on past actions. Thus, actions may be allowed or denied in the present and/or future based on what has been allowed in the past. One such implementation for data security controls is known in the art as a firewall.

Intrusion detection systems (IDS) may be used in computer systems and networks. IDSs may be used to detect and identify unauthorized use of a computer(s). Generally, an IDS looks for specific patterns, or Signatures, via logs, network traffic, file modification and other sources available, to detect malicious activity. These signatures may be identified using, for example, finite state machines, simple pattern matching, or specialized algorithms. Many IDSs may be prone to both false positive and false negative alerts. False positives occur when the IDS identifies a problem (e.g., unauthorized activity) and such a problem has not occurred. False negatives occur when an IDS does not detect a problem when a problem has occurred.

In light of the reliance on historical data and the possibility of false positives and false negatives, in order to fully protect a system, mere Signatures of negative patterns may be desirable but not sufficient. A negative Signature approach addresses the identification of that which is not allowed. The complementary approach, namely the positive Signature approach, defines specifically that which is allowed, or at least acceptable within a tolerable deviation.

Rules, also termed herein as Policies, represent those actions that may be specifically allowed and/or those actions that may be specifically denied. Rules specify the parameters within which transactions operate. A dynamic rule is one in which various responses may change over time such as in response to particular inputs, such as response changes based on various considerations.

Ideally, rules used for IDS testing would be dynamic rules. However, because, rules may be often "hard coded" as part of the binary code of a security system, rules may be typically not truly dynamic. The lack of dynamic rules causes difficulty in a variety of situations, including, for example, when the security software is updated (e.g., the executable code becomes longer and slower, and machines must be turned off to upgrade).

Further, business processes may be typically far more complex than the rules associated with intrusion against a computer system operating those business processes. For example, flows of information may come from multiple entry points, and may not arrive at centralized points. In order to hide the lack of dynamic rules, and to account for the ever-increasing complexity of business processes, network based firewalls may change an IP address via Network Address Translation, more commonly known as NAT, or via Port Address Translation, more commonly known as PAT, to hide a particular internal network configuration. However, in such a "fix", the context of the messaging stays the same although the content seen has been modified. Such fixes may be inefficient to hide, or remedy, changes or terminations of business processes for specific transaction types, and may be likewise inefficient to vary the allowability or disallowability of specific transactions or states over time. Further, such fixes do not allow for various monitoring or control techniques to be added dynamically in a simple manner as various risks through-out an inter-enterprise distributed process may be identified and addressed.

Therefore, the need exists for a system, method, and device that efficiently monitor risk, and that allow for flexibility in modifying or updating risk policy.

SUMMARY OF THE INVENTION

The present invention includes a method, a system, and a device for monitoring risks associated with at least one business process, including: evaluating at least one of a plurality of document instances, wherein each of the document instances includes, in association therewith, a plurality of document values, against a plurality of risk categories; implementing the plurality of risk categories pursuant to at least one acceptable risk policy approved for the at least one business process; and qualifying at least one of the at least one of the plurality of documents pursuant to an approval rating of the at least one document in at least one risk category.

Thus, the present invention provides a system, method, and device that efficiently monitor risk, and that allow for flexibility in modifying or updating risk policy.

BRIEF DESCRIPTION OF THE DRAWINGS

Understanding of the present invention will be facilitated by consideration of the following detailed description of the present invention taken in conjunction with the accompanying drawings, in which like numerals refer to like parts:

FIG. 1 is a diagram depicting mapping between Document, Risk Categories and Policy;

FIG. 2 is a diagram depicting multiple risk policies against multiple Document Instances;

FIG. 3 is a diagram depicting relationships between Documents, policies and Qualifications;

FIG. 4 is a diagram depicting the obtaining by a Document Instance of values from a database(s) to incorporate into fields (values);

FIG. 5 is a diagram depicting components of an RDS;

FIG. 6 is a diagram depicting secure transmission of Templates;

FIG. 7 is a diagram depicting the performance of policies from different organizations;

FIG. 8 is a diagram depicting secure transmission of Instances or Templates from an RDS;

FIG. 9 is a diagram depicting user access as related to a Trust Manager; and

FIG. 10 is a diagram depicting the combination of multiple Documents into one using the method of FIG. 4.

DETAILED DESCRIPTION

It is to be understood that the figures and descriptions of the present invention have been simplified to illustrate elements that may be relevant for a clear understanding of the present invention, while eliminating, for purposes of clarity, many other elements found in a typical information device, apparatus, system, and method. Those of ordinary skill in the art will recognize that other elements may be desirable and/or required in order to implement the present invention. But because such elements are well known in the art, and because they do not facilitate a better understanding of the present invention, a discussion of such elements is not provided herein. The disclosure herein is directed to all such variations and modifications to the applications, networks, systems and methods disclosed herein and as will be known, or apparent, to those skilled in the art. Further, the present invention may be illustratively described hereinthroughout, however, those skilled in the art will recognize, in light of the disclosure herein, that the present invention may be beneficially employed in a myriad of business transactions and processes.

FIG. 1 is a flow diagram illustrating the evaluation of a Document 101 that includes multiple values 104 against a risk Policy 107. Document 101 may be provided to the illustrated system via web access, web service, a gateway, physical documentation converted to electronic form, such as by optical character recognition (OCR) or scanning, or by any similar methodologies known to those skilled in the art. The present invention is in no way limited by the manner in which the Document or its conversion to an electronic form is provided.

Document 101, as used herein, may be or represent values that may be important to a business system or process. Values may be fields in a record, as is known in the art. Document 101 may be a subset or superset of one or more Documents that initially have paper based definitions or structure, or of established or structured data sources. Such data sources or paper based definition may contain values, including values obtained from other sources. Reference to Document 101 includes, without limitation, reference to all fields within the Document.

Documents may be defined into an RDS system and its associated infrastructure. For example, a scripting language, or a technique implementing a GUI (Graphic User Interface), or other representations, may be used. According to an aspect of the present invention, an extensible language, such as XML [XML], may be used. The XML used may be in accordance with the "Survey Sample: Web Form Design in ASP.NET" by Allen Wagner.

For example, the XML code may include:
XML-A

```
Document Title="BuildingSecurity" <SourceType="UserWebInput"
Source="www.xxx.com/survey">
   <Destination="MasterDB.BldSecurity">
   <Question ID="0" visible="yes" Text="Building Number?"
Type="Numeric">
       <Answer Tag="Building Number" PrimaryKey="BLD">
   </Question>
   <Question ID="1" visible="yes" Text="What country is building in"
Type="Character">
       <Answer Tag="CountryValue">
   </Question>
   <Question ID="2" visible="no" Type="real" >
       <Answer Compute=CountryRiskTable(CountryValue).riskvalue * 4>
   </Question>
   <Question ID="3" visible="yes" Text="Are Fences higher than 10
   feet?"
Type="integer">
       <Answer ID="1" Text="Yes">
       <Answer ID="2" Text="No">
   </Question >
   <Question ID="4", visible="yes" Text="Do fences have barbed
   wire?"
Type="multiple choice>
       <Answer ID="1" Text="Yes">
       <Answer ID="2" Text="No">
   </Question >
   </Document>
```

According to this aspect of the present invention, Document 101, such as a survey, may be specified. This Document specification may create a data definition, although other methodologies to incorporate pre-existing database definitions may be apparent to those skilled in the art. The Source Type may be a web-based input that stores information in an appropriate record under a database, such as under MasterDB.BldSecurity with a primary key of BLD. In this example, the web site that may be placed is www.xxx.com/survey.

Questions may be numbered using an ID, and may be displayed based on whether the "Visible" flag is set to "Yes", as in the present example. The question to be displayed is provided in "Text" and the type of response is in "Type", as in this example. Types may include, without limitation, "character," "numeric," "freeform," "multiple choice", Boolean, or the like, for example. Other types may be apparent to those skilled in the art, and may be validated against proper, or improper, input types.

"Answer" has multiple purposes in the above example, and typically may represent a submitter's input. A submitter may be a person, a process, an automated, manual, electronic or mechanical input, by way of non-limiting example only.

"Tag" may be used as a variable name for questions. In the above example, CountryValue (defined in ID=1) in the ID=2 compute field views the riskvalue in the CountryRiskTable as indexed by CountryValue. The answer to the question in this example, which is not visible during input in this example, is the risk value for the country multiplied by four (4).

The above example illustrates web-based input. It may be apparent to those possessing an ordinary skill in the pertinent arts that other forms of input may be provided for. For example, questions might not be displayed, but rather may take the form of electronic inquiries, such as inquiries that access information, as "answers" or input, from a digital format, such as from a database. Input responsive to a question may, for example, be any transmitted electron packet representing information in a data store, such as a database, directory or flat file. In such cases, the data description may describe the manner of obtaining the values to be input. For example, the data description may state that the value is a specific field within a database table, or the first X bits, starting from bit Y, in a data value. In cases where visible="No", inputs responsive to questions may be computed values not taken from human input.

FIG. 4 represents the exemplary use of "Tag" and "compute." Again, a document 101 may include a series of values. For simplicity, Values 1 through 4 (above line 402) may be, in this example, values visible to a user, and the remaining values below the line may not be visible to the user. Value n 403 may be a copy of Value 1 in this embodiment, as illustrated. Value 5 405 may be obtained from a local store, such as a database 406. Values 5 and Value 6 may each be identified by a tag, which tags may be for explanatory purposes and may be denoted TAG V5 (e.g., <Answer Tag="TAG_V5">) and TAG_V6, respectively. A more complex computation 404 may be any function f which may be required of the security system and capable of calculation, and may use visible values and invisible values. The result of function f may be directed to a required or requested location, such as the placement of the result as Value 6 in this example. This may be coded, such as in the above example, as <Answer Compute="TAG_V5*TAG_V6">.

Returning now to FIG. 1, Risk Categories 102 may categorize risks into various groupings to address certain objectives, and may be in accordance with tolerable risks for one or more business processes. As an example, in [BS 7799], information security is characterized as the preservation of confidentiality (C), integrity (I) and availability (A). It is common in risk management applications that a system may be evaluated separately based on various unique or applicable criteria and such an evaluation may be analyzed simultaneously. In the aforementioned BS 7799 example, using grades for Confidentiality, Integrity or Availability, the controls necessary to satisfy each criteria may be different, and in fact, may in some cases conflict. For example, in container shipping it is expected that evaluation of processes that control loading of goods, and sealing of goods into containers, would be evaluated under separate and distinct, and possibly conflicting, risk related criteria.

Without limitation, Risk Categories referenced in FIG. 1 may be specified in XML, or a similar schema, for example. For example, an XML coding for such risk categorization might include:

```
<RiskCategories>

<Category Name="Confidentiality" Description="For privacy protection">
<Category Name="Integrity" Description="For modification of data">
<Category Name="Availability" Description="For ability to use resource">
</RiskCategories>
```

However, Risk Categories may be an aggregate calculation of risk to some attribute of risk, rather than a specific risk aspect of some attribute of risk. Thus, the aggregation may be one to one 106, many to one 109, or one to many 105. As such, the exemplary XML-A discussed hereinabove may be modified as:

XML-B

```
<Question ID="3" visible="yes" Text="Are Fences higher than 10 feet?"
Type="integer">
    <Answer ID="1" Text="Yes">
    <Risk Name="RiskCat1" Script="Add(50)" >
    <Risk Name="RiskCat2" Script="Add(20)">
    </Answer}
    <Answer ID="2" Text="No">
    <Risk Name="RiskCat1" Script="Add(10)">
    <Risk Name="RiskCat2" Script="Substract(10)">
    </Answer>
</Question >
```

In XML-B, if question 3 has a response of Yes, then 50 is added to RiskCat1 and 20 is added to RiskCat2. Note that subtraction, addition, division, multiplication, multiplication by constants or factors, or other calculation functions may be used, as shown in Answer ID="2". Additionally, calculations may occur in stages. For example, if answer A is yes, multiply by 3, if the result is greater than 50, ask question B, and if the response is answer C, subtract 3. Further, data from one, or many, or other sources may be drawn upon in the performance of such a calculation. For instance, a function F may be performed on the input value (e.g., "Add (thisInput*5)"), the response (i.e., thisInput) may be multiplied by 5, and the result may be added to an appropriate Risk Category. Functions may be complex, and may include other programming aspects, such as incorporating a programming script using Java or another high level language, for example. Without limitation, a programming script or calculation may specify tag names, such as "CountryValue" described in XML-A, within a function to represent a value, or as an index to locate a value, such as a value in a database or web location table, for example.

Risk Categories may be analyzed pursuant to one or more risk Policies 107. Thereby, Document 101, and more specifically the values of a document 101, may be rated against a risk Policy in accordance with one or more requested risk policies.

In the following example, multiple rules may be applied in which the "Action," a script using a specialized language or known language (e.g., Basic, Visual Basic, C, C++, Java, Perl) is performed when the "Criteria," a script returning true or false, is assessed. As will be apparent to those skilled in the art, the following example is not limited to a particular language, and may additionally be performed, for example, in XML.

Name: <policy name>
Rule: <label>
Criteria: <conditional script>
Action: <script>

Policy-Rule:
PolicyName: SilverBuilding
Rule: RequireSupervisor
Criteria: ((Riskcat1>50) or (Riskcat2>1000)) and (Riskcat3>5)
Action: Require("Supervisor", RED); exit( )
Rule: EmailCommerce
Criteria: ((Riskcat1>20) or (Riskcat2>100))
Action: Notification (email, "warning@commerce.com", "Review Company X Warning logs")
Rule: Accept
Criteria: Null
Action: Accept("1 June 2004")

The above example is followed herein from top to bottom. Some of the functions of note include, by way of example, but may be not limited to:

Exit( ): exit and do not test against any additional rules;

Require(<Group>, <FLAG>, <effective date>): acceptance of the Document requires someone from group <Group> to accept. User is provided a FLAG value (e.g., RED condition) to help user understand the severity of the problem, and <effective date> states the effective date for the acceptance by the user of the Document (i.e., how long the acceptance is good for) once a user of Group has accepted the Document;

Notification (<type>, <user name>, <subject>, <Body>): send a notification to <user name> with Subject <subject> and Body <body>. Types of notification include but may not be limited to email, calendar, fax, automated telephone calls, and other forms of notification systems. Emergency notification may call government agencies (e.g., like a "911" call) for first responder actions, such as by law enforcement, transportation, commerce, military or other agency;

Schedule(<date/Time>,<actions script>): this schedules the action script to be performed at a specific data and time (i.e., <date/Time> field). For instance, a transaction may be initiated or notification may be set after a specific time;

Accept(<date>): instance is accepted against Policy and is effective until and including the date in date field;

Store(<value1>,<location1>, <value2>, <location2>, . . . ): stores value1 into location1, value2 into location2, etc. Locations may be database fields, for instance. Store may be to local storage or inter- or intra-data stores, for example (see FIG. 5);

PushPolicy(<policy description>: this may push a Policy into the present system or off to another system. For instance, satisfaction of a certain set of conditions causes a Policy change on an RDS instance processing for other RDSs;

Create Transaction(<transaction type>, <recipient>, <field1>, <value1>, . . . ): similar to PushPolicy, create transaction will transmit a transaction Document to recipient of the form transaction type. The data fields for the transaction place value1 into field1.

As will be apparent to those skilled in the art in light of the disclosure herein, specialized scripts and other forms of programming languages may likewise be used in the present invention, such as to allow for more sophisticated and complex coding of criteria and rules. Such additional complexity might include, for example, looping structures, including external to internal and internal to external looping, access to external data, including external specialized scripts, initialization values, and other complex conditional statements.

Policy templates may provide suggestions, changes, modifications, or generally accepted practices to allow for generation of risk policies, or to allow for transference of data for use as inputs for risk policies. For example, policy data may take numerous forms, as will be apparent to those skilled in the art, and policy templates may provide for the transference of one form to another form. Hereinbelow is an exemplary illustration of a "trigger policy" Policy template, illustrated using XML:

Trigger-Policy

```
<TriggerPolicy>
    <Event ID="1" Document="BuildingSecurity" Criteria="
CountryValue = "Korea">
    <Policy Name="GoldBuidingAsia">
    <Policy Name="SilverBuilding">
    </Event>
    <Event ID="2" Document="BuildingSecurity" >
    <Policy Name="GoldBuiding">
    <Policy Name="SilverBuildingAsia">
    </Event>
    <Event ID="3" Document="FacilitySurvey" >
    <Policy Name="SurveyPolicy">
    <Event>
    </TriggerPolicy>
```

For example, in the exemplary "BuildingSecurity" Document (see examples XML-A and XML-B hereinabove), the Trigger Policy Template first checks if the Country value matches "Korea." If it does, then the policies GoldBuildingAsia and SilverBuilding may be tested against the Document. If it does not, then the policies GoldBuilding and SilverBuildingAsia may be tested against the Document.

Policy templates, such as Trigger-Policy, may also create or incorporate other Document-Instances. For example:

```
<Event ID="1" Document="BuildingSecurity"
Criteria="CountryValue = Korea">
    <Replace Document="KoreaBuildingForm">
    <Event>
    <Event ID="2" Document="KoreaBuildingForm" Criteria="
CountryValue = "Korea">
    <Policy Name="GoldBuildingAsia">
    <Policy Name="SilverBuilding">
```

In this example, the BuildingSecurity Document is converted into a new Document, KoreaBuildingForm. The new Instance of the form KoreaBuildingForm is run through the trigger Policy. The mapping from BuidlingSecurity to KoreaBuildingForm may be achieved in a variety of ways, as will be apparent to those skilled in the art. Mapping from a tag value to a tag value may be an exemplary approach for information transference using policy templates. For example, a country value may exist in two forms, and the policy template mapping is done one to one.

As used herein, an instance of Document 101 may be an approved instance or a disapproved instance. A Document Instance may be an approved Document if one of following two conditions is true:

Accept ( ) is performed;

Require( ) is performed, which includes that a member of the Group specified in Require( ) has approved the Document.

Computation 108 may illustrate an example of the computation of a Risk Category. The method of computation may be complex, entity specific, or generic and non-entity specific, for example. For simplicity, in this example, exemplary operations may be of the form: F(g (Value), h (Value, Value'))=Risk Cat value, where F is a mathematical summation of the input values. In this example, g and h may be various algebraic functions, such as if (value=True) then return 50 else return 100. Similarly, multiple choices may be generalized. For example, a computation may return (value*constant), where constant is a predefined integer. Thus, the values g and h may be or require one or multiple inputs, which may be external, such as data inputs responsive to questions, or internal, such as application of a constant to data obtained, as in computation 108 for h.

FIG. 2 is a flow diagram illustrating the application of a plurality of risk policies. Document Instance 202 for document 101 represents, in this example, a "filled-out form" for a specific input instance. The illustrative Document Instance 202 is weighted 205 against one or more Risk Categories, wherein Risk Cat Value x, y represents the value for Document y under Risk Category y. Thereby, with respect to specific exemplary Risk Policy 201, Document Instance 202 may be Approved, such as approved via the Accept( ) function, or via the Require( ) function after the user from the Group accepts the Document Instance, or disapproves. Document Instances 202 may be approved under more than one Policy 203, 204 before ultimate approval, such as in a hierarchy of risk policy applications to a given document 101.

In the exemplary embodiment of FIG. 2, risk policy 203 demonstrates a Document Instance accepted under only one Policy, and risk policy 204 demonstrates a Document Instance approved under more than one Policy.

It should be noted that, in the example of XML-B, the Risk Category (RiskCat)Values may be dependent on the Document, and the same Document Instance may not generate multiple RiskCat values, such as those that, for example, might be associated with different Policies. However, the same Document Instance may be evaluated under two different policies by deeming the Risk Category to have different values under each Policy. For example, a company may have an internal confidentiality policy and an external confidentiality policy. Such a policy could be that any confidential digital data leaving the organization must be encrypted while in transit, whereas internally transmitted data need not be encrypted. A Document may thus specify whether data leaving an internal server is encrypted. Thereby, for the internal policy, the "confidentiality" Risk Category would generally not affect transmission from the internal server to that or another internal server. However an answer of "NO" with regard to encryption for that document would affect the risk for the "confidentiality" Risk Category if the attempted transmission was external. Thus, in this example, the confidentiality Risk Category score has different results under different policies.

This restriction in exemplary XML-B may simplify evaluation by reviewers that may understand a Risk Category to have only one meaning. Such a restriction with regard to risk categories is exemplary only, and need not be used in the present invention. In such an exemplary approach, risk value evaluation may be limited to that specified in a Policy-Rule. A risk policy reference may be incorporated into XML-B as follows:

```
<Risk Name="confidentiality" policy="confidentiality-external"
Script="Add(5)" >
    <Risk Name="confidentiality" policy="confidentiality-internal"
Script="Add (0)" >
```

Document Instances may have an approval in relation to a Policy. Similarly, Policy and Qualification may be linked. FIG. 3 is a flow diagram illustrating the relation between policy and qualification. A set of Documents 305 may be related to a policy or a set of policies 301 via relation 306. A Qualification 302 may relate to one or more Policy Instances 301. For example, Qualification 1 302 and Qualification 2 may be earned if a Document Instance 101, or a document instance set 305, is approved against Policy 1. A Qualification may require more than one Policy approval 304. In this example, a Document Instance must have approvals for Policy 2 and Policy m to earn Qualification 3. Thus, there may be present a layering between Policy and Qualification. As discussed hereinabove with regard to the hierarchical nature of Policies, Qualifications may likewise be hierarchical, both with regard to other Qualifications, and with regard to Policies. A Qualification may be coded, such as in XML, as shown:

QUAL-Template

```
<Qualifications>
<QUAL Name="GoldSeal" Description="Corporate Gold Seal for
Vendor">
</Rules ID="1">
<Cat ID="1" Name="GoldPolicyPhysical>
<Cat ID="2" Name="GoldPolicyProcesses">
</Rules></QUAL>
<QUAL Name="SilverSeal" Description="Corporate Silver Seal for
Vendor">
<Rules ID="1">
<Cat ID="1" Name="GoldPolicyPhysical">
<Cat ID="2" Name="SilverPolicyProcesses">
</Rules>
<Rules ID="2">
<Cat ID="1" Name="SilverPolicyPhysical">
<Cat ID="2" Name="GoldPolicyProcesses">
</Rules>
<Rules ID="3">
<Cat ID="1" Name="SilverPolicyPhysical">
<Cat ID="2" Name="SilverPolicyProcesses">
</Rules>
</QUAL>
</RiskCategories>
```

In the above example, Qualification "GoldSeal" may only be earned if GoldPolicyPhysical and GoldPolicyProcesses may be achieved. However "SilverSeal" is earned if either GoldPolicyPhysical or GoldPolicyPhysical is achieved, and similarly SilverPolicyProcesses or SilverPolicyPhysical may be achieved, but not if both GoldPolicyProcesses and GoldPolicyPhysical may be achieved.

FIG. 10 simplifies the exemplary illustration of FIG. 4. As illustrated, a Document Instance may relate to multiple inputted "Documents" that have been inputted at different times. For example, Document A (values below line 1002) may have been received at time=0 and stored in database 1004. At time=1 Document B (values above line 1002) may be received. Document A may be placed in a Document Instance 1003.

The Policy evaluation discussed hereinabove may be part of a Risk Detection System (RDS). A RDS may exist within a larger infrastructure, as is illustrated in FIG. 5. The RDS may evaluate Policies against Documents, maintain storage to evaluate Policy 507, and determine Qualifications. The RDS may be linked to one or more Aggregators 506. Aggregators may include an RDS that takes information from multiple RDSs, and feeds policies and Documents to other RDSs. If two Documents appear at two RDSs, the Aggregator may include a reconciler, such as an Intra Global Database 502. An Aggregator may dynamically generate or apply Policies partially based on history. For example, if multiple inputs into an Aggregator from discreet RDS instances indicate excess exposure to country risk, the Aggregator may modify the Policies in various RDSs to control the risk. For example, post-modification Documents representing transactions may not be accepted by the modified Policy because the acceptable threshold value for country risk may have been re-set high, thereby precluding acceptance of previously acceptable Document scores.

As RDS and Aggregator may receive information from an Intra Global Database, and may obtain information from an Inter Global Database 502. Inter Global Databases may be outside an organization. For instance, the Bureau of Customs and Border Protection, an external organization, may have "watch lists" for persons or entities that it recommends no business be done with, as well as controls, such as handling requirements, for specific classes of cargo. The U.S. State Department maintains a known terrorist list, and other government agencies and institutions, regulatory and standards organizations, partners, and various other providers also maintain data useful for an RDS. Some companies may also provide statistical and other data useful to dynamically and pro-actively generate policies. As such information may be distributed to systems and trust levels may be established.

Trust manager 503 represents a security trust system, such as a Public Key infrastructure (PKI) [X500,X509, RFC3280] or Kerberos [Neuman] or other means known in the art [Menezes]. Trust Managers may be managed by an inter- or intra-Regulatory Organization. A Regulatory Organization is any person or group that regulates those approved to communicate within an infrastructure, and may regulate what rights those approved communicators have. A Trust Manager may make security scalable. However, the infrastructure of FIG. 5 does not require the use of Trust Managers, as security may be established directly, such as with the physical exchange of cryptographic keys, or by other methods known in the art.

Entry Points 501 may be sources where data is received. An RDS may receive data directly from, or in combination with, an Entry Point. Entry Points may be probes in an intrusion detection system. Entry Points may reduce cost, by only receiving data and place data at an RDS or at an Inter- or Infra-Global Database for an RDS or Aggregator to use. Entry points may be specialized and may be used to offload workload from the RDS.

For example, XML-B hereinabove includes Policy enforcement, although an Entry Point may do some level of Policy review of Documents. This reduces the risk of outsiders discerning the Policy of the RDS. Entry Points may also establish trust directly, or via a Trust Manager 503.

FIG. 6 is a flow diagram illustrating a Policy Template, Policy-Rule, or Policy Template for a Qualification or a Document, such as XML-A or XML-B, may be securely transmitted. A Template 605, for example, may be transmitted 602. The sender may be an Aggregator, an RDS or a Regulatory Organization, for example. Trust Manager 604 may establish trust between the RDS and the sender 603. As an example, if the Trust Manager is a PKI and messages sent by sender are signed, the RDS may validate the signature based on a certificate. The RDS, which may also be an Aggregator, receives the Template, which may be authenticated, and may incorporate the Policy Template into subsequent evaluations.

Policy Templates may be generated by different organizations and components within an infrastructure. Precedence, i.e. the order of an evaluation, may be specified, as shown in FIG. 7. In the example of the Policy-Rule application hereinabove, the Policy is evaluated "top down". The Policy 702 may be made up of sub policies. For instance, Policy 702 may be performed before Policy 703. Some organizations may be placed higher, such as wherein government agencies may take precedence over corporate 703 or locally defined entities or persons 704. An organization may also specify precedence in its Policy Template. For example, Rule: <label>
Priority: <High=1 to Low=10>
Criteria: <conditional script>
Action: <script>

In this example, a government agency may place multiple Templates into the RDS and these may be given priority over other sources 702.

Access to an RDS may be allowed for various organizations. Access control may restrict access to information, or the modification of information, based on who the user is and how that user is identified. FIG. 9 depicts a user 905 having access 906. The user 905 may belong to an Inter Regulatory organization or Infra Regulatory organization 902. Trust relationship 903 depicts trust between Trust Manager 904 and the regulatory organization 902, and trust relationship 907 between the trust manager 904 and the RDS 901. Trust may be imposed between Trust Manager and the user through mechanisms developed for computer security. Such examples include Registration Agents within a PKI, acting on behalf of the regulatory agency, to validate users, and the process for the certification of user public keys. Based on the trust relationships established via the Trust Manager 904, the user may have specific access rights to the RDS, and may have access rights to an Aggregator, or Global Database, based on the rights provided to that user via some access control mechanism. A government agent or partner may have restricted or expanded access, while internal users may have different access rights. For example, a government agent may be automatically granted certain access rights to otherwise restricted data and data stores, conditioned upon the occurrence of a defined event and presentation of appropriate credentials, including provision of on-line evidence of identity or role.

An RDS may communicate with another RDS to provide Instances or Templates of policies, Documents and/or Qualifications. RDS1 801 may send an object to RDS2 802 or Global Database data 806, 803, 804. Send 803 or 804 may be authenticated, such as being digitally signed, or sent via secure tunnel, such as via SSL, VPN, IPSEC, or the like, or by some other secure means, as may be known to those possessing an ordinary skill in the pertinent art. Security may use or be established through a Trust Manager via trust relationships 805 to the send 803 and 804. Relationship 805 may represent a certificate relationship by Trust Manager acting as a certification authority (CA) in a public key infrastructure (PKI), for example.

FIG. 8 depicts a push approach in which the RDS pushes out the various Instances and reports in a secure manner, such as the Instance signed with a public key certified by the Trust manager acting as a CA. In practice, the RDS need not require a push approach, but rather may present information locally in response to information being pulled. That is, it may provide a pull rather than a push. Hence, RDS application 802, 806 may make the request and receive the data locally 801.

The data that an RDS or, similarly, a Global Database or other data store, such as a file, directory, or the like, presents externally is useful to the users. In FIG. 8, several types of information may be presented. Reporting may be audit logs, aggregated risk exposures, anomalies found, and other events that indicate an auditable condition. Reporting may allow external parties to review procedures being used, although specific audit level access rights may also be required. Qualification Templates, Policy Templates, or Document Templates may allow for an RDS to send Templates for external review or to be implemented by another RDS.

The RDS may support various Roles. Those roles may include: RDS Administrator: performs basic management of the system such as, but not limited to, providing access to users, i.e. ID management, groups and external components; monitoring the performance of the system; ensuring backups may be performed, and other basic tasks not generally related to the risk that the system is monitoring; Template Creator: create(s) the various Templates used in the application including Policy, Document and Qualification Templates;

Data Entrant: submit(s) data into the system. There may be different categories of data entrants with differential rights, for example, some may be permitted to fill out some forms and not others, or only fill out forms for specific groups;

Risk Manager: specifies Policy tolerances for Risk Categories and Qualifications, how the Risk Categories may be determined, and the actions the policies perform against the various categories;

Document Approver: approves a Document Instance against a Policy when a Require( ) action has been set that requires acceptance of a Document, either for each Instance or for some defined group or groups of Instances;

Supervising Approver: special groups of Approvers. Some organizations may require an Approver as well as a Supervisor for Document approval; and Auditor: have read-only access to review the actions of others.

Roles may be performed, at least in part, by computer systems. For instance, Templates may be also created by RDS and Aggregators, and Data Entrants may be Entry Points. Risk Managers may be a special type of Template creator that may be, for instance, the RDS or Aggregators. These may review past actions to determine Policies for future actions.

In an intermodal container shipping example of the present invention, categories defined may include Infrastructure Assets, Transport Assets and Shipment Articles. Infrastructure Assets relate to the infrastructure used for the movement of intermodal containers from point to point, including from point of loading to point of unloading. Examples of Infrastructure Assets, include computer systems, information processing systems, warehouses, and terminals within ports. Infrastructure Assets may be not limited to physical entities or things, but may be legal entities as well. For instance, the company owning and/or managing a warehouse may be classified as an Infrastructure Asset. Transport Assets may be assets directly used for the physical movement of Shipment Articles, but which may not be part of the shipment. For instance, a train engine, container or other ship or aircraft, used for the specific purpose of moving Shipment Articles, may be a Transport asset. If it is difficult to determine whether an asset is an Infrastructure or Transport Asset, it may be treated as both. Shipments Articles may be the actual shipped goods, and specific assets and documentation used in or related to the movement of those goods. This category may include, but may not be limited to, the containers that bound the physical shipments, seals that may be barrier or indicative, or manual or electronic, the modification of the shipment, and documentation related to the specific shipment, such as shipping instructions, bills of lading, and the like.

Survey, questionnaires and/or other mechanisms may be used to identify Infrastructure Assets and other aspects of those Infrastructure Assets, such as persons in some way accountable for the Infrastructure Asset. Infrastructure Assets may have sub-parts, systems or components. For example, a building may be an Infrastructure Asset. However, the storage facility located within the building, but subject to different physical, logical or legal controls may be treated as a subcomponent of the building but still classified as an Infrastructure Asset. Infrastructure Assets may be evaluated, based on the type of facility, against different criteria including, but not limited to:

Controls on physical security (e.g., types of locks, height of fences, number of security guards, etc.);

Controls on personnel security (e.g., background checks, employment contracts, etc.);

Controls on data systems (e.g., confidentiality, integrity and availability, etc.)

Historical controls (e.g., prior history to determine if fixed assets perform appropriately);

Insurance (e.g., kinds of insurance and its limits);

Prior-legal and/or regulator actions against the asset (e.g., have there been or may be there existing legal or regulatory actions initiated against the assets, judgments, injunctions, verdicts, consent decrees, etc.);

Contractual controls (e.g., contractual provisions regarding the Infrastructure Asset, its workers or plant, etc.);

Vendor controls (e.g., who they are, how they have been evaluated, etc.);

Record keeping and auditing controls (e.g., method of record keeping, types of auditing controls, etc.); and Procedures and practices (e.g., methods for accomplishing tasks).

These criteria, or a composition or decomposition of these, may be treated as Risk Categories. Additional Risk Categories may be included as necessary. The nature of the asset being evaluated may determine the Risk Categories used to evaluate it, as well as the choice or weighting of the data values, used to calculate the Risk Category values. Thus the questions composing the Physical Security Risk Category for a low value warehouse may be different than those composing the same Risk Category for a high value data center, for example.

An asset may be entered for use by an RDS in multiple ways. It may be entered using a web system, or another application may inform the RDS of a new asset, for example. There may be specialized RDS for entry of assets of one or more types. These may then provide data related to the asset to other RDS systems. The new asset may reach another database (e.g., a vendor database). The fixed asset information may come from an Aggregator, another RDS, Inter- or Infra-Data Stores or other sources. Information may also be obtained from field work, surveys, government forms, or other data, whether internal or external.

Once an asset is defined, an evaluation may be made based on the appropriate Policy. Introduction of a new asset may be a triggering event, such as a new vendor transaction, such as a web-based entry, and the triggering event may cause evaluation against a trigger Policy. This evaluation may create multiple actions as part of the Policy, for instance a) it may require certain surveys (e.g., physical building survey) to be performed and, therefore, notifications to be sent to appropriate people to inform them a new vendor has been initiated and that they must complete a survey, b) internal and external data vetting may be initiated (e.g., check denied party lists, check any legal/regulatory actions, validate insurance policies, financial status, etc.), such as an external party evaluation (e.g., initiate purchase of a third party to do a site survey or other analysis). As more information is received, it may be tested against Policy by the Trigger Policy. As more information is received, the Policy may be satisfied as to some cases, and Qualification of an asset may be achieved in the satisfied cases. Moreover, asset Qualification (which may be of Transport, Infrastructure or Shipping Articles as well as shipments themselves) may be a precondition to other occurrences, such as in the supply chain wherein a shipment is booked; carriage of a shipment by a carrier on either a direct booking basis from the shipper or as one received from, for example, a non-vessel operating common carrier; pricing for carriage; delivery times promised; insurance coverage of the goods carrier or of other assets used to carry, handle, pack or store the goods.

Approval under a Policy, similar to a Qualification, may be short term. For instance, a short term approval may be provided if there is a material but not significant impairment to, or lack of, an anticipated control. For example, a Physical Security Policy for buildings may change. Buildings meeting certain secrecy criteria may only accept locks accepted under a previous Physical Security Policy for up to one month. After one month, a short term approval may no longer be valid.

Policies may be specified in a hierarchical nature, as discussed hereinabove. For example, a "gold seal" (i.e., a high level on the hierarchy) may not require certain checks on shipments that would otherwise be required against a lower level on the hierarchy. Similarly, this may be done on Qualifications. As may be seen, the same approach may be taken to classify assets upon evaluation, with ones meeting certain criteria as being "gold seal." A ship—a Transport may be owned by a company which is itself an "Infrastructure Asset". Naturally, there is an "owner of" relationship in one direction, and "owned by" in the other, for many exemplary assets. Assets may have relationships that may be relevant to evaluating the risk of any particular transaction. These relationships, which may be one to one, one to many and/or many to many, may be used to evaluate risk. As an example, a port may be evaluated against physical security, for example. Relationships may show that part of the physical security for a port is "managed by" another entity. The "managed by" entity may also be evaluated and its risk appropriately calculated into the port's risk.

Associations available for relationships that may affect risk include: Owned by; Lessor of; Lessee of; Customer of; Vendor of; Supplier of; Managed by; Regulated by; Insured by; Audited by; Evaluated by; Inspected by; Audited by; Operated by; Processes for; Financial institution for; Insurer of; Guarantor of; Security for; Related to (when association type is not specified in system); and The inverses of the above (e.g., Owned by inverse is owner of).

Shipment Articles may include the goods being transported, packaging thereof, an intermodal container the goods may be transported within, and various security, visibility or status devices for the container for the goods, and shipment related Documents or messages (e.g. a bill of lading or an advance shipping notice). Shipment Articles may be part of what is evaluated in the risk management evaluation of a particular shipment and, in particular, the containers within it. Areas of risk and risk information repositories and approaches include the following:

The risk postures in all or some of various dimensions (e.g. physical, logical, financial, etc.) of the Infrastructure Assets or Transport Assets (including accountability programs for all supply chain phases, addressing workers and business property) may be used to collect, manufacture, package, load, seal, move, etc., the Shipment Articles;

Screening to Inter- or Infra-Data Stores for relevant information about Infrastructure Assets, their ownership or other material "related-to" relationships that could impact risk;

The conditions under which the container is loaded and sealed, including inspection, loading and documenting procedures of various types, use of independent inspection agencies, physical access controls, logical protections, etc.;

Positive and negative rule sets for containers related to, among other possible parameters, trip duration, weight, time, location, state, etc. and other associated risk management rules and exception procedures, for example:

No more than a certain period of time;
No shorter than a certain period of time;
No further than a particular measured distance;
At least as far as a particular measured distance;
Variation from an expected route whether on a road or on water;
Prohibited locations, including determination by GPS tracking;
Expected locations, including determination by GPS tracking;
Documentation anomalies such as inappropriate source or destination based on origin or season;
Door open or light content rules for sensors or seals;
Unexpected nuclear, biological or chemical materials;
Unexpected temperature changes;
Unexpected gas content such as $CO_2$;
Analysis for anomalies of shipment or container related status messages that may already be provided among supply chain participants; and
Analysis of shipment related Documents (other than status messages) for anomalies.

It should be noted various incidence histories and Signature Templates, as well as the reporting function, may be independent services in the present invention. That is, knowing that some aspect of a system may be approved by some approving agency or person may be valuable. As an example, a vendor may be approved against a Policy by an institution. This approval may be incorporated into an RDS. The approval incidence may be signed, or have other security controls placed on it. A company may purchase an approval incidence, such as wherein the regulatory agency sells approvals as a means to fund itself, or may be permitted to sell the approval incidence, or some aspect of it, to a third party.

In an embodiment, a document is provided having values therein. The values may be scored in accordance with one or more risk policies, which policies may be resident in one or more risk policy templates. The risk analysis may be performed in accordance with multiple scoring mechanisms. For example, financial institutions may score a document and its values in one manner, while insurance institutions may score the same document and its values in a different manner.

In such an exemplary embodiment, a global supply chain risk may be evaluated. For example, a warehouse in the supply chain may include a great plurality of documents having a great plurality of values. These documents may be categorized in accordance with a risk for the documents in each category. For example, warehouse security may form one category, and power supply may be another. The risks may be analyzed against a risk policy based on values. For example, a document for warehouse security may include the value "cameras present: yes". Obviously, such a value factor may substantially affect the application of the policy for warehouse security, and whether the security passed or failed, or reached a certain qualification, based on application of the risk policies to such a value.

As such, this exemplary link in the supply chain may be scored for each category, and for overall categories. The risk analysis, and the overall risk analysis, may follow one or more templates. For example, if the warehouse is present in a first country, where crime is high, an overall score of 80, or a security score of 85, may be unacceptable. However, if the warehouse is present in a second country, where crime is low, an overall score of 70, or a security score of 75, may be deemed acceptable.

Additionally, or alternatively, other flows may be monitored through the use of the present invention. For example, transactional flows may be scored by independent transaction part, or by overall transaction. Scoring may include, for example, purchase ordering, invoicing, or container storage, for example. Scoring may likewise be directed to, for example, any business processes, including manual, electronic, or a blend of both, and scoring may be for all, or select portions, of any document or flow. Reporting may be available for any division, or for the entirety, of the application of the present invention. Reporting may be electronic, or paper, for example.

One skilled in the art might implement the present invention by using readily available hardware and software techniques, in accordance with the teachings set forth herein and the references referred to herein and incorporated into this disclosure. Further, any of a variety of computing aspects, languages, or scripts, including XML, may be incorporated into the present invention.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

The invention claimed is:

1. A system for monitoring and controlling risks associated with a supply chain, comprising:
    a processor;
    a memory coupled to the processor, wherein the memory contains a software program to be run by the processor that provides for the following;
    accessing the memory to identify one or more supply chain infrastructural elements;
    identifying one or more safety based risk elements each associated with said one or more identified supply chain infrastructural elements, wherein the one or more safety based risk elements include one or more of:
    external malicious threats, intrusion detection, safety of personnel, safety of infrastructure, safety of data systems, physical subversion of assets, or physical subversion of delivery mechanisms,
    wherein each of the one or more safety based risk elements corresponds to one of a plurality of risk categories, and wherein each of the plurality of risk categories has an associated base value that corresponds to an average risk value,
    wherein a derived risk value for each of the one or more safety based risk elements is determined based on at least one of a relative degree of risk and risk of a particular type with respect to the associated at least one of the identified supply chain infrastructural elements, wherein an associated risk value of each of the risk categories is determined based on one or more derived risk values of the one or more safety based risk elements associated with such risk category, and wherein the associated risk value corresponds to at least one of a physical location, a logical location, and a type of the associated at least one of the identified supply chain infrastructure elements;
    analyzing a probability of an occurrence of a threat outcome using the processor based on a transparency, character, logic and trust of the data;
    determining a risk threshold based on a value of a threat times the probability of the occurrence of the threat outcome, wherein the value of the threat is based on the associated risk values for the plurality of risk categories,
    wherein at least one risk policy is determined for each of the plurality of risk categories, to arrive at a set of risk policies, wherein implementation of the set of risk policies comprises evaluating a risk associated with at least one of the one or more identified supply chain infrastructural elements to determine whether the risk exceeds or does not exceed the risk threshold;
    receiving information indicating that the one or more identified supply chain infrastructural elements is to be utilized in the supply chain and using the processor to evaluate said information against the set of risk policies to determine if the risk threshold is exceeded; and
    if the risk threshold is exceeded, flagging the one or more identified supply chain infrastructural elements or categorizing the one or more identified supply chain infrastructural elements as high risk.

2. The system of claim 1, wherein the risk threshold is dynamic based on one or more of the overall threat environment, intelligence, and the one or more safety based risk elements.

3. The system of claim 1, wherein if the risk threshold is exceeded, taking responsive actions until the risk is deemed mitigated.

4. The system of claim 1, further comprising taking one or more responsive actions based on the one or more identified supply chain infrastructural elements for which the risk threshold has been exceeded, until at least one risk category value is reduced sufficiently such that the risk threshold is no longer exceeded.

5. The system of claim 1, further comprising allowing access to an infrastructural element if the risk threshold is not exceeded.

6. The system of claim 1, wherein the supply chain comprises the shipment of freight.

7. The system of claim 1, further comprising if the risk threshold is exceeded, adjusting at least one risk policy of the set of risk policies.

8. A system for monitoring and controlling risks associated with a supply chain, comprising:
    a processor;
    a memory coupled to the processor, wherein the memory contains a software program to be run by the processor that provides for the following;
    accessing the memory to identify one or more supply chain infrastructural elements;
    identifying one or more safety based risk elements each associated with said one or more identified supply chain infrastructural elements, wherein the one or more safety based risk elements include one or more of:
    external malicious threats, intrusion detection, safety of personnel, safety of infrastructure, safety of data systems, physical subversion of assets, or physical subversion of delivery mechanisms, wherein each of the one or more safety based risk elements corresponds to one of a plurality of risk categories, and wherein each of the plurality of risk categories has an associated base value that corresponds to an average risk value, wherein a derived risk value for each of the one or more safety based risk elements is determined based on at least one of a relative degree of risk and risk of a particular type with respect to the associated at least one of the identified supply chain infrastructural elements, wherein an associated risk value of each of the risk categories is determined based on one or more derived risk values of the one or more safety based risk elements associated with such risk category, and wherein the associated risk value corresponds to at least one of a likelihood of occurrence, cultural concerns, magnitude, ability to mitigate, and resource availability;

analyzing a probability of an occurrence of a threat outcome using the processor based on a transparency, character, logic and trust of the data;

determining a risk threshold with respect to the one or more identified supply chain infrastructural elements and the safety based risk elements based on a value of a threat times the probability of the occurrence of the threat outcome, wherein the value of the threat is based on the associated risk values for the plurality of risk categories, wherein at least one risk policy is determined for each of the plurality of risk categories, to arrive at a set of risk policies, wherein the set of risk policies vary based on at least one of the physical location, logical location, and type of physical structure, wherein implementation of the set of risk policies comprises evaluating a risk associated with at least one of the one or more identified supply chain infrastructural elements to determine whether the risk exceeds or does not exceed the risk threshold;

receiving information indicating that the one or more identified supply chain infrastructural elements is to be utilized in the supply chain and using the processor to evaluate said information against the set of risk policies to determine if the risk threshold is exceeded; and if the risk threshold is exceeded, flagging the one or more identified supply chain infrastructural elements or categorizing the one or more identified supply chain infrastructural elements as high risk.

9. The system of claim 8, wherein the risk threshold is dynamic based on one or more of the overall threat environment, intelligence, and the safety based risk elements.

10. The system of claim 8, wherein if the risk threshold is exceeded, taking responsive actions until the risk is deemed mitigated.

11. The system of claim 8, further comprising taking one or more responsive actions based on the one or more identified supply chain infrastructural elements for which the risk threshold has been exceeded, until at least one risk category value is reduced sufficiently such that the risk threshold is no longer exceeded.

12. The system of claim 8, further comprising allowing access to an infrastructural element if the risk threshold is not exceeded.

13. The system of claim 8, wherein the supply chain comprises the shipment of freight.

14. The system of claim 8, further comprising if the risk threshold is exceeded, adjusting at least one risk policy of the set of risk policies.

15. A system for monitoring and controlling risks associated with a supply chain, comprising:
a processor;
a memory coupled to the processor, wherein the memory contains a software program to be run by the processor that provides for the following;
accessing the memory to identify one or more supply chain infrastructural elements;
identifying one or more safety based risk elements each associated with said one or more identified supply chain infrastructural elements, wherein the one or more safety based risk elements include one or more of:
external malicious threats, intrusion detection, safety of personnel, safety of infrastructure, safety of data systems, physical subversion of assets, or physical subversion of delivery mechanisms,
wherein each of the one or more safety based risk elements corresponds to one of a plurality of risk categories, and wherein each of the plurality of risk categories has an associated base value that corresponds to an average risk value,
wherein a derived risk value for each of the one or more safety based risk elements is determined based on at least one of a relative degree of risk and risk of a particular type;
determining a risk threshold with respect to the one or more identified supply chain infrastructural elements and the safety based risk elements,
wherein at least one risk policy is determined for each of the plurality of risk categories, to arrive at a set of risk policies, wherein implementation of the set of risk policies comprises evaluating a risk associated with at least one of the one or more identified supply chain infrastructural elements to determine whether the risk exceeds or does not exceed the risk threshold;
receiving information indicating that the one or more identified supply chain infrastructural elements is to be utilized in the supply chain and using the processor to evaluate said information against the set of risk policies to determine if the risk threshold is exceeded;
modifying at least one risk policy of the set of risk policies and the determination of a risk value using the processor based on a transparency, character, logic and trust of the data; and
if the risk threshold is exceeded, flagging the one or more identified supply chain infrastructural elements or categorizing the one or more identified supply chain infrastructural elements as high risk.

16. The system of claim 15, wherein the risk threshold is dynamic based on one or more of the overall threat environment, intelligence, and the one or more safety based risk elements.

17. The system of claim 15, wherein if the risk threshold is exceeded, taking responsive actions until the risk is deemed mitigated.

18. The system of claim 15, further comprising taking one or more responsive actions based on the one or more identified supply chain infrastructural elements for which the risk threshold has been exceeded, until at least one risk category value is reduced sufficiently such that the risk threshold is no longer exceeded.

19. The system of claim 15, further comprising allowing access to an infrastructural element if the risk threshold is not exceeded.

20. The system of claim 15, wherein the supply chain comprises the shipment of freight.

21. The system of claim 15, further comprising if the risk threshold is exceeded, adjusting at least one risk policy of the set of risk policies.

22. A method implemented using a processor and a memory, for monitoring and controlling risks associated with a supply chain, comprising:
- accessing the memory to identify one or more safety based risk elements within a supply chain infrastructure where the safety based risk elements include one or more of:
- external malicious threats, intrusion detection, safety of personnel, safety of infrastructure, safety of data systems, physical subversion of assets and physical subversion of delivery mechanisms;
- identifying one or more supply chain infrastructural elements within the supply chain infrastructure, wherein each of the one or more safety based risk elements is associated with one or more of the supply chain infrastructural elements;
- categorizing the identified one or more safety based risk elements according to risk categories, wherein the risk categories each have an associated base value and the identified one or more safety based risk elements have a derived value whose magnitude indicates at least one of a relative degree of risk and risk of a particular type with respect to the corresponding supply chain infrastructural elements;
- generating an associated risk value for each of the risk categories, wherein the associated risk value of each of the risk categories corresponds to the likelihood of occurrence, magnitude, ability to mitigate, and resource availability, or relating to an event associated with the corresponding one or more safety based risk elements;
- defining a set of risk policies according to the risk categories, wherein each of the risk policies is associated with a risk threshold corresponding to the supply chain infrastructure elements and the safety based risk elements of the supply chain at issue, wherein each risk threshold is determined based on the value of a threat times the probability of the occurrence of a threat outcome with respect to the supply chain infrastructure elements and safety based risk elements of the supply chain at issue, wherein the value of the threat is based on the associated risk values for the plurality of risk categories, and wherein the probability of occurrence of the threat is analyzed using the processor based on a transparency, character, logic and trust of the data;
- receiving information indicating that one or more supply chain infrastructural elements is to be utilized in the supply chain and using the processor to evaluate said information against each of the risk policies of the set of risk policies to determine if the risk threshold of the risk policy, corresponding to the supply chain infrastructural element or supply chain at issue, is exceeded; and
- if the risk threshold is exceeded, flagging the supply chain infrastructural element or supply chain at issue or categorizing the supply chain infrastructural elements or supply chain at issue as high risk.

23. A system for monitoring and controlling risks associated with a supply chain, comprising:
- a processor;
- a memory coupled to the processor, wherein the memory contains a software program to be run by the processor that provides for the following;
- accessing the memory to identify one or more supply chain infrastructural elements;
- identifying one or more safety based risk elements each associated with said one or more identified supply chain infrastructural elements, wherein each of the one or more safety based risk elements corresponds to one of a plurality of risk categories, wherein each of the plurality of risk categories has an associated base value;
- determining a derived risk value for each of the one or more safety based risk elements based on an analysis of a plurality of data corresponding to the one or more identified supply chain infrastructural elements considering a type and a location of the associated one or more identified supply chain infrastructural elements, wherein a cumulative risk value of each of the risk categories is determined based on a weighted average of the derived risk values of each of the one or more safety based risk elements that corresponds to such risk category;
- determining a risk threshold based on a value of a threat times the probability of the occurrence of the threat outcome, wherein the value of the threat is based on a weighted average of the associated base values for each of the plurality of risk categories;
- determining at least one risk policy for each of the plurality of risk categories, to arrive at a set of risk policies;
- receiving information indicating that the one or more identified supply chain infrastructural elements is to be utilized in the supply chain;
- determining a total risk value based on the set of risk policies corresponding to the one or more identified supply chain infrastructural elements that is to be utilized in the supply chain and using the processor to evaluate the total risk value against the set of risk policies to determine if the risk threshold is exceeded; and
- if the risk threshold is exceeded, flagging the one or more identified supply chain infrastructural elements or categorizing the one or more identified supply chain infrastructural elements as high risk.

24. A system for monitoring and controlling risks associated with a supply chain, comprising:
- a processor;
- a memory coupled to the processor, wherein the memory contains a software program to be run by the processor that provides for the following;
- accessing the memory to identify one or more supply chain infrastructural elements;
- identifying one or more safety based risk elements each associated with said one or more identified supply chain infrastructural elements;
- determining a derived risk value for each of the one or more safety based risk elements based on an analysis of a plurality of data corresponding to the one or more identified supply chain infrastructural elements;
- determining a risk threshold based on a value of a threat times the probability of the occurrence of the threat outcome;
- determining at least one risk policy for each of the plurality of risk categories, to arrive at a set of risk policies;
- receiving information indicating that the one or more identified supply chain infrastructural elements is to be utilized in the supply chain;

determining a total risk value based on the set of risk policies corresponding to the one or more identified supply chain infrastructural elements that is to be utilized in the supply chain and using the processor to evaluate the total risk value against the set of risk policies to determine if the risk threshold is exceeded; and if the risk threshold is exceeded, flagging the one or more identified supply chain infrastructural elements or categorizing the one or more identified supply chain infrastructural elements as high risk.

* * * * *